United States Patent [19]
Bauer et al.

[11] 3,895,076
[45] July 15, 1975

[54] PROCESS FOR THE PREPARATION OF MONOMETHYLETHERS OF DIHYDROXYBENZENE

[75] Inventors: Kurt Bauer, Holzminden; Reiner Molleken, Golmbach; Rudolf Hopp, Holzminden, all of Germany

[73] Assignee: Haarmann & Reimer GmbH, Holzminden, Germany

[22] Filed: Aug. 2, 1972

[21] Appl. No.: 277,205

[30] Foreign Application Priority Data
Aug. 13, 1971 Germany............................ 2140738

[52] U.S. Cl............................................. 260/613 D
[51] Int. Cl.............................................. C07c 41/00
[58] Field of Search................................ 260/613 D

[56] References Cited
UNITED STATES PATENTS
3,689,570   9/1972   Gradeff et al................... 260/613 D FOREIGN PATENTS OR APPLICATIONS
1,225,655   9/1966   Germany........................ 260/613 D
827,803   1/1952   Germany........................ 260/613 D Primary Examiner—Bernard Helfin
Attorney, Agent, or Firm—Burgess, Dinklage & Sprung

[57] ABSTRACT

Monomethylethers of an unsubstituted or symmetrically substituted dihydroxybenzene are prepared by reacting the dihydroxybenzene with methanol in the liquid phase at a temperature from 200°C to 240°C in the presence of boron phosphate as a catalyst.

18 Claims, No Drawings

PROCESS FOR THE PREPARATION OF MONOMETHYLETHERS OF DIHYDROXYBENZENE

This invention relates to a process for the preparation of monomethylethers of dihydroxybenzenes.

Methanol or dimethylether is used for etherification in the process for the preparation of methyl ethers of dihydroxybenzenes described in German Patent Specification No. 827,803. The catalysts used in this process are boron phosphate or strands of silica gel impregnated with phosphoric acid. The process is carried out in the gaseous phase at a temperature in the range of from 250° to 300°C., the formation of the unwanted by-product Veratrol decreasing with increasing temperatures (e.g., at 250° – 260°C; 8% Veratrol).

If the reaction is carried out at lower temperatures in the liquid phase using phosphoric acid as catalyst (German Patent Specification No. 1,225,655) difficulties arise due to the formation and accumulation of unwanted by-products. By this method, for example, carried out according to Example 1 of German Patent Specification No. 1,225,655, a mixture containing at least 15% of the unwanted dimethyl ether is obtained at temperatures of 170° to 230°C, the exact amount depending on the ratio of homopyrocatechol to methanol and the reaction temperature employed.

The conventional processes employed for the preparation of monomethyl ethers of dihydroxybenzenes have the disadvantage that quantities of the corresponding dimethylethers are formed as undesirable by-products.

It has now been found that monomethylethers of either unsubstituted dihydroxybenzenes or dihydroxybenzenes symmetrically substituted with lower alkyl radicals may advantageously be prepared by reacting dihydroxybenzene with methanol in the liquid phase at a temperature in the range of from 200° to 240°C. in the presence of boron phosphate as catalyst.

The unsubstituted dihydroxybenzenes used for the process according to the invention are pyrocatechol, resorcinol and hydroquinone. Symmetrically substituted dihydroxybenzenes used are preferably derivatives of the aforesaid dihydroxybenzenes which are substituted symmetrically to the hydroxyl groups by one or two methyl or ethyl radicals. By symmetrically substituted derivatives of dihydroxybenzenes are meant compounds which yield a uniform product and not a mixture of structurally isomeric monomethylethers when etherified by the process according to the invention. The following are mentioned as examples of symmetrically substituted derivatives: 3,6-dimethyl-pyrocatechol, 3,6-diethyl-pyrocatechol, 4,5-dimethyl-pyrocatechol, 4,5-diethyl-pyrocatechol, 2-methyl-resorcinol, 2-ethylresorcinol, 5-methylresorcinol, 5-ethyl-resorcinol, 2,5-dimethyl-resorcinol, 2,5-diethyl-resorcinol, 4,6-dimethyl-resorcinol, 4,6-diethyl-resorcinol, 2,3-dimethyl-hydroquinone, 2,3-diethyl-hydroquinone, 2,5-dimethyl-hydroquinone and 2,5-diethyl-hydroquinone.

The starting materials used for the process according to the invention are preferably pyrocatechol, resorcinol or hydroquinone, most preferably pyrocatechol.

The rection temperatures for the process according to the invention are generally in the range of from 200°C to 240°C., preferably from 220° to 240°C. The reaction may be carried out either at atmospheric pressure or at excess or sub-atmospheric pressure.

Boron phosphate used as catalyst may be employed as such, in the form of a powder or also in the form of pellets or tablets on a carrier material which is preferably silica gel. The catalyst can be recovered from the reaction unchanged.

It has proved to be useful to employ boron phosphate used as catalyst in that modification, which is insoluble in water (see Kirk-Othmer, Encyclopedia of Chemical Technology, Vol. 3 (1964), page 650).

The quantity of catalyst used is not critical. If the process according to the invention is carried out batchwise, the catalyst may advantageously be used in quantities of 0.01 to 5.0 mols per mol of dihydroxybenzene, preferably 0.1 to 0.5.

The proportion of dihydroxybenzene to methanol used may vary within a wide range. Proportions (in mol) of 1 : 0.1 to 1 : 50 may generally be used, preferably 1 : 1 to 1 : 7.

The methanol used as reactant generally serves as solvent for the dihydroxybenzene which is to be etherified, but the process may also be carried out in the presence of an inert solvent such as benzene or toluene.

The process according to the invention may be carried out either in an open or in a closed reaction vessel, e.g., in a reaction tube equipped with a dosing device or in an autoclave and it may be carried out either intermittently or continuously.

According to a particular embodiment for continuous production by the process according to the invention, the reaction vessel is equipped with an internal thermometer and a distillation attachment and contains the boron phosphate catalyst e.g., in the form of a powder which may be applied to a suitable carrier, e.g., silica gel, or in the form of pellets or tablets with a diameter of from 0.1 to 1 cm. The reaction vessel may be heated to the required reaction temperature either before or after the reactants have been introduced. At the reaction temperature, the ether formed is distilled off through the distillation attachment together with excess methanol, water of reaction and unreacted dihydroxybenzene. If the process according to the invention is carried out continuously, the excess methanol and unreacted dihydroxybenzene are returned to the reaction vessel, if necessary after first purifying them by distillation.

The process according to the invention has the advantage over conventional processes of providing high yields of valuable monomethylethers of dihydroxybenzene with only about one percent of unwanted dimethylethers. In contrast to the conventional processes, it has the further advantage that the composition of the mixture of reaction products surprisingly depends very little on the ratio of dihydroxybenzene to methanol put into the process. Only about 1% of unwanted dimethylethers is formed even if a very large excess of methanol is used.

The monomethylethers of dihydroxybenzenes obtained by the process according to the invention are valuable intermediate products, e.g., pyrocatechol monomethylether is used for the production of Vanillin (German Reichspatent No. 621,567), hydroquinone monomethylether is used as antioxidant (Kirk-Othmer, Encyclopedia of Chemical Technology, Vol. 11 (1966) page 490) and as intermediate product for the production of antioxidants while resorcinol monomethylether is used as stabilizer for synthetic resins (Ullmanns Enzyklopadie der technischen Chemie, Vol. 14 (1963)

page 681). Derivatives of the above mentioned compounds which are substituted by alkyl groups may also be used as stabilizer and antioxidants (Ullmanns Enzyklopadie der technischen Chemie, Vol. 8, (1957) page 742).

EXAMPLE 1

550 g of pyrocatechol (5 mol) and 160 g of methanol (5 mol) together with 250 g of boron phosphate were heated in a 2 1 autoclave at 240°C and an operating pressure of 110 atmospheres (initial pressure 70 atmospheres of $N_2$) for 5 hours. The reaction mixture was worked up by distillation to yield 50 g of crude guaiacol containing 49.5 g of guaicol (8% based on the quantity of pyrocatechol used) and 0.45 g of Veratrol (0.065% based on the quantity of pyrocatechol used). In addition, 503 g of unreacted pyrocatechol were recovered. Yields based on reacted pyrocatechol: 93.4% of guaiacol and 0.76% of Veratrol.

EXAMPLE 2

330 g of pyrocatechol (3 mol) and 660 g of methanol (20.6 mol) together with 150 g of boron phosphate were heated in a 2 litre autoclave at 240°C and a pressure of 110 atmospheres for 5 hours. The reaction mixture was worked up by distillation to yield 55 g of crude guaiacol containing 52.8 g of guaiacol (14.2% based on the quantity of pyrocatechol used) and 0.6 g (0.14% based on the quantity of pyrocatechol used). In addition, 281 g of unreacted pyrocatechol were recovered. Yields based on reacted pyrocatechol: 95.5% of guaiacol and 0.98% of Veratrol.

EXAMPLE 3

20 g of boron phosphate granules (about 1 to 6 mm diameter) were introduced into a heatable vertical reaction tube (60 cm in height, 2.5 cm in diameter) which had a finely porous glass frit base and was equipped with an internal thermometer. The boron phosphate was heated up to a reaction temperature of 240°C. When this temperature was reached a solution of 220 g of pyrocatechol in 220 g of methanol was forced into the reaction tube from below through the glass frit by means of a dosing pump in the course of 2 hours and at the same time the crude guaiacol formed was distilled off through an attached distillation column. The excess methanol which was distilled over at the same time, was separated from the crude guaiacol by distillation and returned to the reaction tube towards the end of the reaction to ensure complete reaction of any unreacted pyrocatechol left in the tube.

A crude distillate which contains 140 g of guaiacol ($\triangleq$ 56.9%), 2.07 g of Veratrol ($\triangleq$ 0.75%) and 83.6 g ($\triangleq$ 38%) of unreacted pyrocatechol in addition to methanol and water of reaction was obtained (the percentage yields are based on the pyrocatechol put into the reaction).

EXAMPLE 4

The process was carried out as described in Example 3 but at a reaction temperature of 230°C 121.5 g guaiacol (approximately equals 49%), 2.5 g ($\triangleq$ 0.75) and 103.4 g ($\triangleq$ 47%) of unreacted pyrocatechol were obtained (the percentage yields being based on the pyrocatechol put into the reaction).

EXAMPLE 5

The process was carried out as described in Example 3 but at a reaction temperature of 220°C 94 g of guaiacol (= 38%), 2.3 g of Veratrol (= 0.85%) and 128 g (= 58%) of unreacted pyrocatechol were obtained (the percentage yields being based on the pyrocatechol put into the reaction).

EXAMPLE 6

The process was carried out as described in Example 2 but 330 g of hydroquinone (3 mol) instead of 330 g of pyrocatechol were reacted with 660 g (20.6 mol) of methanol in the presence of 150 g of boron phosphate. Working up the reaction mixture by distillation yielded 41.8 g of a crude product consisting of 41.3g of hydroquinone monomethylether (corresponding to 11.1% of the pyrocatechol put into the reaction) and 0.5 g of hydroquinone dimethyl ether (corresponding to 0.12% based on the hydroquinone put into the reaction). 292 g of unreacted hydroquinone was recovered. Yields based on reacted hydroquinone: 96.4% of hydroquinone monomethylether, 1.05% of hydroquinone dimethylether.

It will be understood that the specification and examples are illustrative but not limitative of the present invention and that other embodiments within the spirit and scope of the invention will suggest themselves to those skilled in the art.

What is claimed is:

1. Process for the preparation of a monomethylether of unsubstituted or symmetrically lower alkyl-substituted dihydroxybenzene selected from pyrocatechol, resorcinol, hydroquinone and symmetrically alkyl-substituted dihydroxybenzene wherein each lower alkyl substituent contains up to 2 carbon atoms, which process comprises continuously introducing the dihydroxybenzene to be etherified and methanol into a reactor and maintaining them therein in the liquid phase at a temperature in the range of from 200°C to 240°C in the presence of a catalyst consisting essentially of boron phosphate, continuously withdrawing ether, unreacted methanol and unreacted dihydroxybenzene and recycling to the reactor unreacted dihydroxybenzene continuously.

2. Process as claimed in claim 1 wherein each lower alkyl substituent contains two carbon atoms.

3. Process as claimed in claim 1 wherein the unsubstituted dihydroxybenzene is pyrocatechol.

4. Process as claimed in claim 1 wherein the unsubstituted dihydroxybenzene is resorcinol.

5. Process as claimed in claim 1 wherein the unsubstituted dihydroxybenzene is hydroquinone.

6. Process as claimed in claim 1 wherein said dihydroxybenzene is dimethyl substituted.

7. Process as claimed in claim 1 wherein the dihydroxybenzene is 3,6-dimethyl-pyrocatechol, 3,6-diethyl-pyrocatechol, 4,5-dimethyl-pyrocatechol, 4,5-diethyl-pyrocatechol.

8. Process as claimed in claim 1 wherein said dihydroxybenzene is 2-methyl or 2-ethyl resorcinol, 5-methyl or 5-ethyl resorcinol, 2,5-dimethyl or 2,5-diethyl resorcinol, 4,6-dimethyl or 4,6-diethyl resorcinol.

9. Process as claimed in claim 1 wherein said dihydroxybenzene is 2,3-dimethyl-hydroquinone, 2,3- diethyl-hydroquinone, 2,5-dimethyl-hydroquinone or 2,5-diethyl-hydroquinone.

10. Process as claimed in claim 1 wherein the mole ratio of dihydroxybenzene to methanol is in the range of from 1:0.1 to 1:50.

11. Process as claimed in claim 10 wherein the mole ratio of dihydroxybenzene to methanol is in the range of from 1:1 to 1:7.

12. Process as claimed in claim 1 wherein the reaction is carried out at a temperature of from 220°C to 240°C.

13. Process as claimed in claim 1 wherein the boron phosphate is supported on a carrier material.

14. Process as claimed in claim 13 wherein the carrier material is silica gel.

15. Process as claimed in claim 1 wherein the catalyst is used in an amount of 0.01 to 5.0 moles per mole of dihydroxy benzene.

16. A process according to claim 1 wherein water of reaction is removed from the reaction mixture comprising the dihydroxybenzene and methanol by distillation.

17. A process for the preparation of a monomethyl-ether of an unsubstituted or symmetrically lower alkyl-substituted dihydroxybenzene selected from pyrocatechol, resorcinol, hydroquinone and symmetrically alkyl-substituted dihydroxybenzene wherein each lower alkyl substituent contains up to 2 carbon atoms, which process comprises reacting the dihydroxybenzene to be etherified with methanol in a liquid phase at a super atmospheric pressure at a temperature in the range of 200°C to 240°C in the presence of a catalyst consisting essentially of boron phosphate.

18. A process according to claim 17 wherein the dihydroxybenzene is reacted with the methanol under autogenous pressure.

* * * * *